(12) United States Patent  
Eguchi et al.

(10) Patent No.: US 12,620,864 B2  
(45) Date of Patent: May 5, 2026

(54) COVER MEMBER AND A MOTOR UNIT

(71) Applicant: MAHLE International GmbH, Stuttgart (DE)

(72) Inventors: Akihiko Eguchi, Shizuoka (JP); Shota Nogiwa, Shizuoka (JP); Yuki Suzuki, Shizuoka (JP); Tamotsu Tanaka, Shizuoka (JP); Ryosuke Tonooka, Shizuoka (JP)

(73) Assignee: Mahle International GmbH (DE)

( * ) Notice: Subject to any disclaimer, the term of this patent is extended or adjusted under 35 U.S.C. 154(b) by 149 days.

(21) Appl. No.: 18/244,910

(22) Filed: Sep. 11, 2023

(65) Prior Publication Data

US 2024/0088742 A1 Mar. 14, 2024

(51) Int. Cl.  
*H02K 5/02* (2006.01)  
*H02K 5/22* (2006.01)

(52) U.S. Cl.  
CPC .............. *H02K 5/225* (2013.01); *H02K 5/02* (2013.01); *H02K 2203/09* (2013.01)

(58) Field of Classification Search  
CPC ........ H02K 11/30; H02K 11/33; H02K 3/522; H02K 9/227; H02K 5/225; H02K 5/02; H02K 2211/03; H02K 2203/09; H02K 3/52; H02K 3/50  
USPC ................................................. 310/71, 68 R  
See application file for complete search history.

(56) References Cited

U.S. PATENT DOCUMENTS

| | | | | |
|---|---|---|---|---|
| 9,912,208 | B2 * | 3/2018 | Yamasaki | .............. H02K 5/225 |
| 11,258,330 | B2 | 2/2022 | Ueno | |
| 11,527,935 | B2 | 12/2022 | Kobayashi | |
| 2010/0133935 | A1 * | 6/2010 | Kinugawa | ............ H02K 5/1732 |
| | | | | 310/89 |
| 2015/0194857 | A1 * | 7/2015 | Hernandez | ............. H02K 5/225 |
| | | | | 310/71 |
| 2020/0059141 | A1 * | 2/2020 | Okamoto | .................. H02K 3/12 |
| 2022/0224195 | A1 * | 7/2022 | Matsuda | ................ H02K 9/227 |

FOREIGN PATENT DOCUMENTS

| | | |
|---|---|---|
| JP | 2017157418 A | 9/2017 |
| JP | 2020099144 A | 6/2020 |
| JP | 2021016222 A | 2/2021 |

OTHER PUBLICATIONS

English abstract for JP-2017-157418.  
Japanese Notice of Reasons for Refusal dated Mar. 4, 2026 regarding Japanese Patent Application No. 2022-144318.

* cited by examiner

*Primary Examiner* — Alexander A Singh  
(74) *Attorney, Agent, or Firm* — Fishman Stewart PLLC

(57) ABSTRACT

A cover member for a motor unit is disclosed. The cover member is interposed between a motor and a control substrate for controlling operation of the motor. The motor has a bus bar terminal electrically connected to a coil of a stator of the motor. The control substrate has a connection terminal that is fitted to the bus bar terminal and is made to electrically connect the control substrate to the stator. The cover member has a through hole, through which the bus bar terminal pierces, and an enclosing part for enclosing a fitting location for the bus bar terminal and the connection terminal, as seen in a piercing direction of the bus bar terminal.

15 Claims, 6 Drawing Sheets

P-P

R-R

COVER MEMBER AND A MOTOR UNIT

CROSS-REFERENCE TO RELATED APPLICATIONS

This application claims priority to Japanese Patent Application No. JP 2022-144318 filed on Sep. 12, 2022, the contents of which is hereby incorporated by reference in its entirety.

TECHNICAL FIELD

The present invention relates to a cover member for a motor unit, and a motor unit.

BACKGROUND

A bus bar is widely used in order to supply the stator of a motor with electric power. This bus bar extends from the motor side toward a control substrate and is fitted to a contact terminal disposed on the control substrate (see, for example, Patent Literature 1).

CITATION LIST

[Patent Literature 1] JP 2017-157418 A

SUMMARY

In above Patent Literature 1, a fitting location for the bus bar and the contact terminal is exposed. However, when dirt and foreign substances enter the fitting location for the bus bar and the contact terminal, short-circuiting may occur with respect to an adjacent conductor. Therefore, there has been a problem about easily preventing dirt and foreign substances from entering the fitting location for the bus bar and the contact terminal, at low cost.

The present invention is made inconsideration of the above problem and its object is to prevent dirt and foreign substances from entering the fitting location for the bus bar and the contact terminal by means of a simple configuration.

In order to solve the above problem, the cover member for the motor unit according to the present invention is interposed between the motor having a rotor and a stator and the control substrate for controlling operation of the motor. The motor has a bus bar terminal electrically connected to a coil of the stator. The control substrate has a connection terminal, which is fitted to the bus bar terminal and is made to electrically connect the control substrate to the stator. The cover member has a through hole, through which the bus bar terminal pierces, and an enclosing part for enclosing the fitting location for the bus bar terminal and the connection terminal, as seen in the piercing direction of the bus bar terminal. This mode can suppress the entry of dirt and foreign substances into the fitting location. Therefore, the short-circuiting with respect to the adjacent conductor can be avoided.

An inner surface of the through hole may have an inclined surface, which is tilted in such a manner that, the farther the bus bar terminal proceeds in a direction of insertion, the smaller the width becomes. According to this mode, the bus bar terminal can be correctly guided and entanglement at the fitting location for the bus bar terminal and the connection terminal can be suppressed. Due to this, increase of electrical resistance and thermal resistance possibly caused by the entanglement can be avoided, so that reliability can be enhanced.

The cover member may be composed of resin. This mode can reduce a thermal influence between the motor and the control substrate in comparison with a case in which the cover member is composed of metal. Therefore, for example, an expensive element with high thermal resistance does not need to be mounted on the control substrate, so that the costs can be reduced.

DETAILED DESCRIPTION

Figure 1:
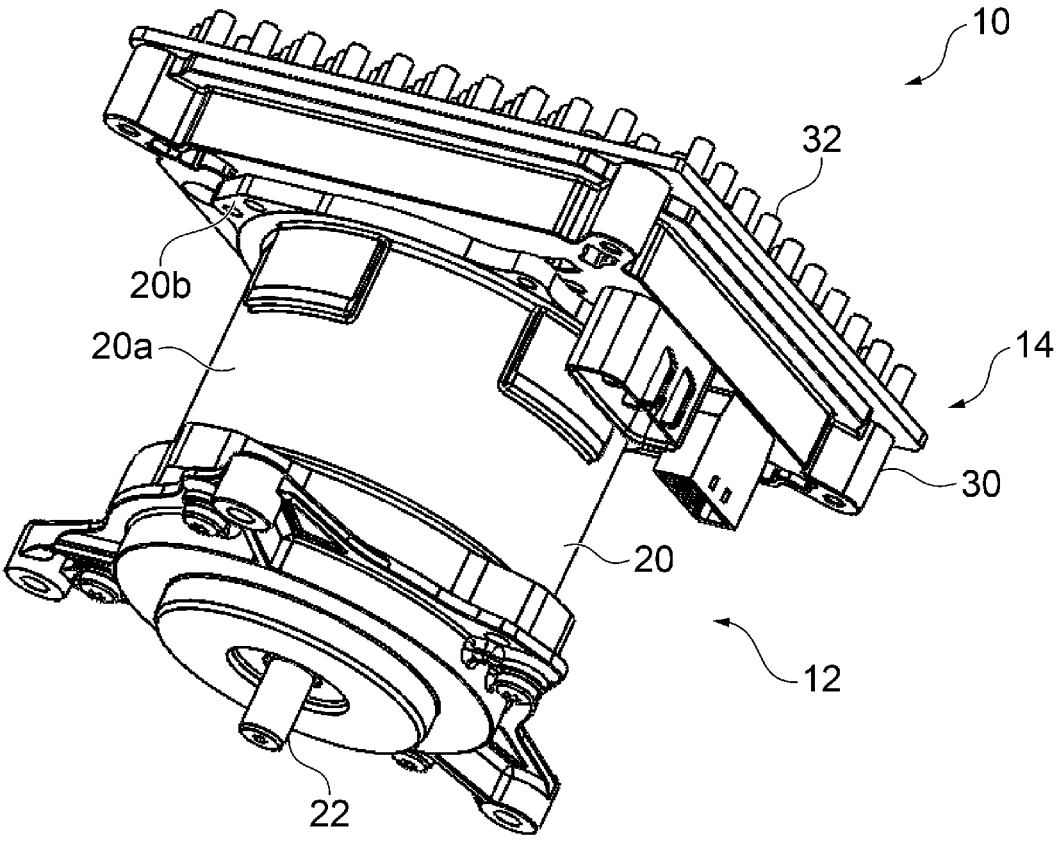
FIG. 1 is a perspective view showing a motor unit according to the present embodiment.
Figure 2:
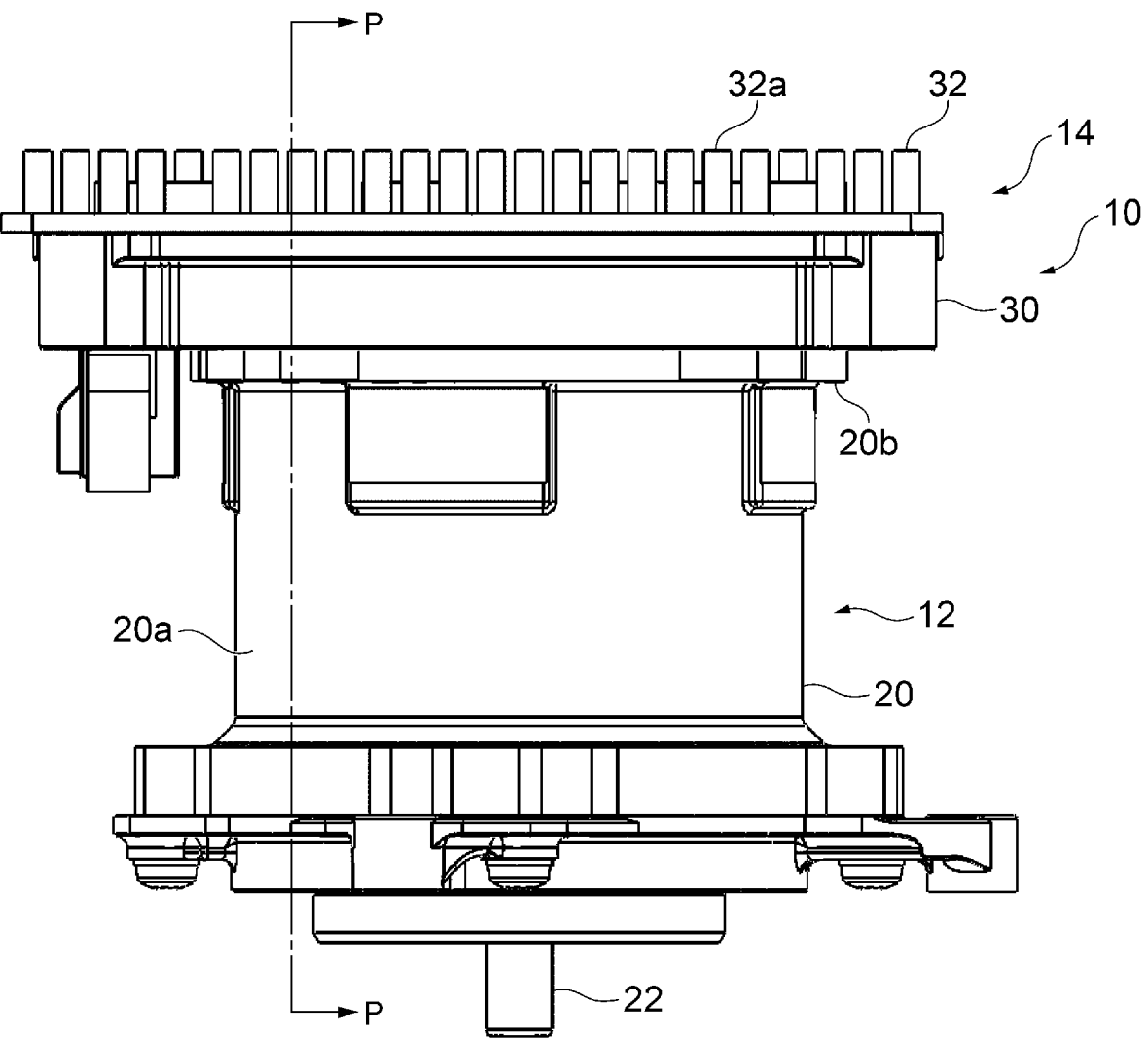
FIG. 2 is a front view showing the motor unit according to the present embodiment.

FIG. 1 is a perspective view showing a motor unit 10 according to the present embodiment. FIG. 2 is a front view showing the motor unit 10 according to the present embodiment. The motor unit 10 includes a motor 12 and an electronic control unit 14. The motor 12 includes a motor housing 20 and a motor shaft 22. The motor housing 20 has a cylindrical part 20a. A (non-illustrated) stator composed of a cylindrically wound coil is housed in the cylindrical part 20a. A (non-illustrated) rotor is further housed in the center of the stator. The rotor is fixed to the motor shaft 22, which is rotatably supported on the motor housing 20. The motor shaft 22 has its tip protruding from one end side of the motor housing 20. A flange 20b is formed at the other end of the motor housing 20. An electronic control unit 14 is attached to the flange 20b by using a fastening tool such as a screw.

The electronic control unit 14 includes a cover member 30 and a heat sink 32. The below-described control substrate is housed in the interior of the cover member 30. After the control substrate is housed, the heat sink 32 is attached to the cover member 30. The heat sink 32 has a large number of fins 32a for heat radiation. The heat sink 32 externally radiates heat generated by the control substrate housed in the cover member 30 to cool the control substrate.

Figure 3:
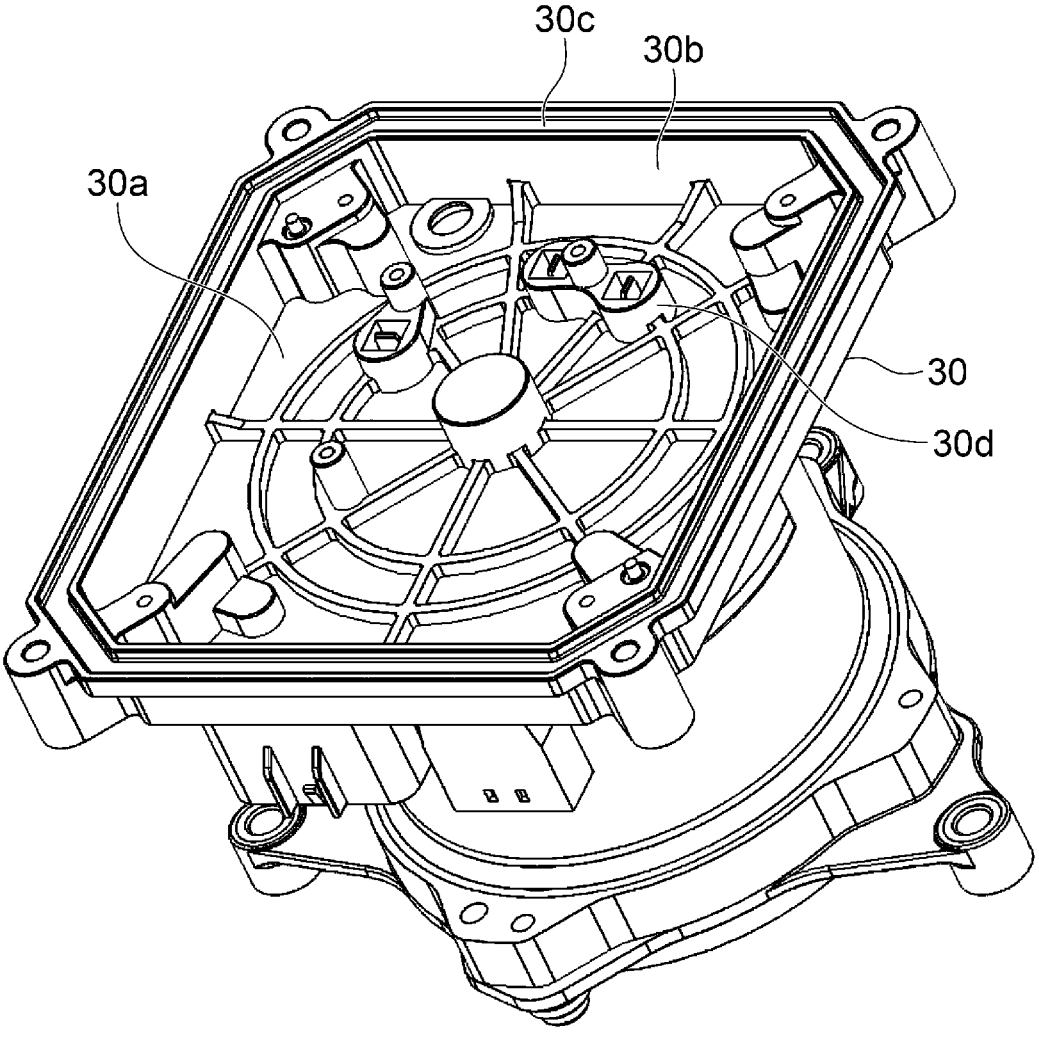
FIG. 3 is a perspective view showing the cover member.

FIG. 3 is a perspective view showing the cover member 30. In order to make understanding easy, the cover member 30 in a state in which the heat sink 32 and the control substrate are detached is shown. The cover member 30 includes a bottom plate 30a, a side wall 30b, a flange 30c, and an enclosing part 30d. The bottom plate 30a is formed to assume a rectangular shape. The side wall 30b extends from four sides of the bottom plate 30a perpendicularly to the surface of the bottom plate 30a. Thus, the cover member 30 is formed to assume a rectangular vessel shape having an opening on a side facing the bottom plate 30a. The flange 30c is formed at an end of the side wall 30b. The heat sink 32 is attached to the flange 30c.

The bottom plate 30a has a plurality of (three in the present embodiment) enclosing parts 30d. The enclosing part 30d is formed to assume a cylindrical shape perpendicularly extending from the bottom plate 30a to the same side as the side wall 30b. The enclosing part 30d will be described below.

Figure 4:
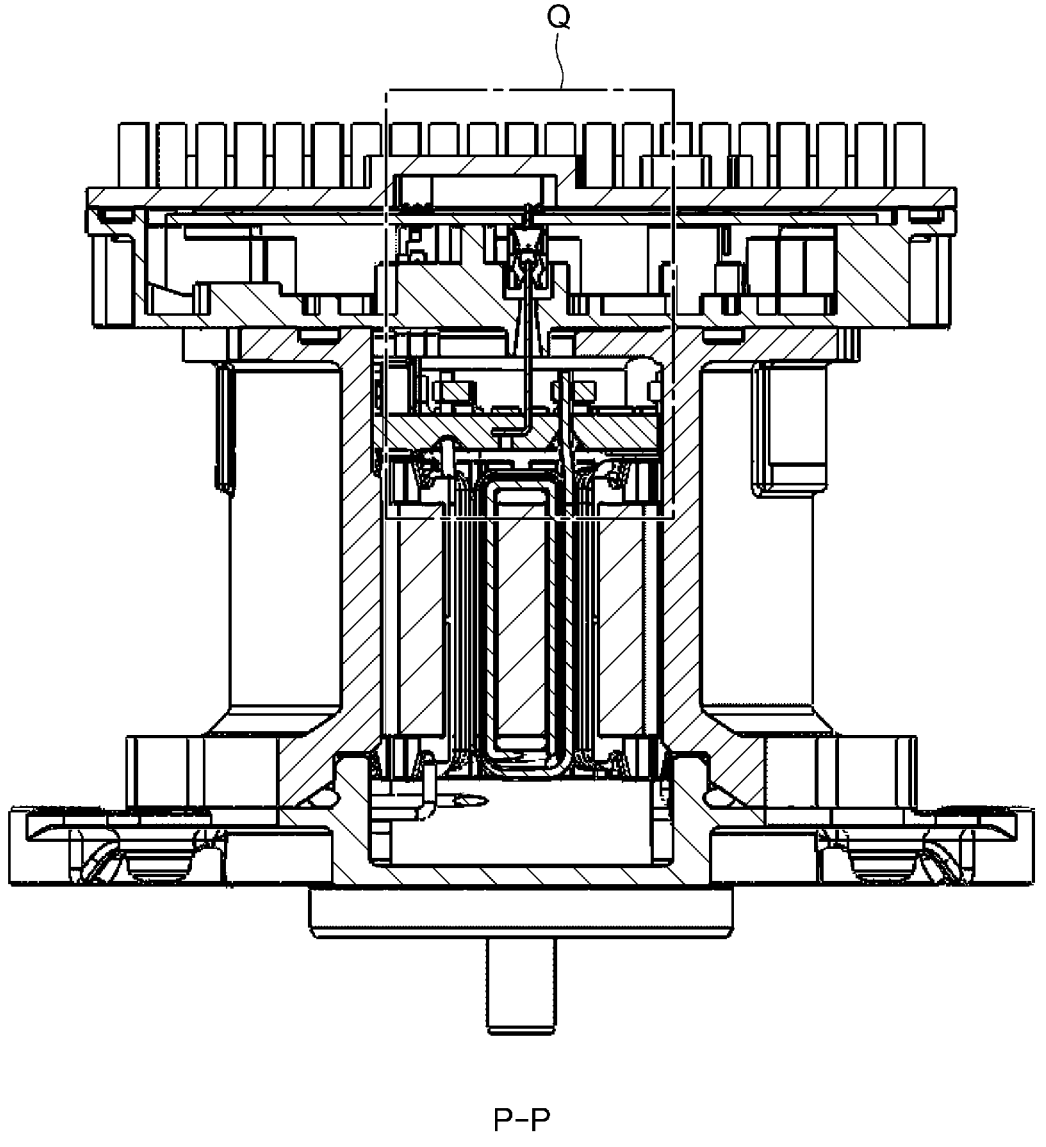
FIG. 4 is a sectional view taken along the P-P line in FIG. 2.
Figure 5:
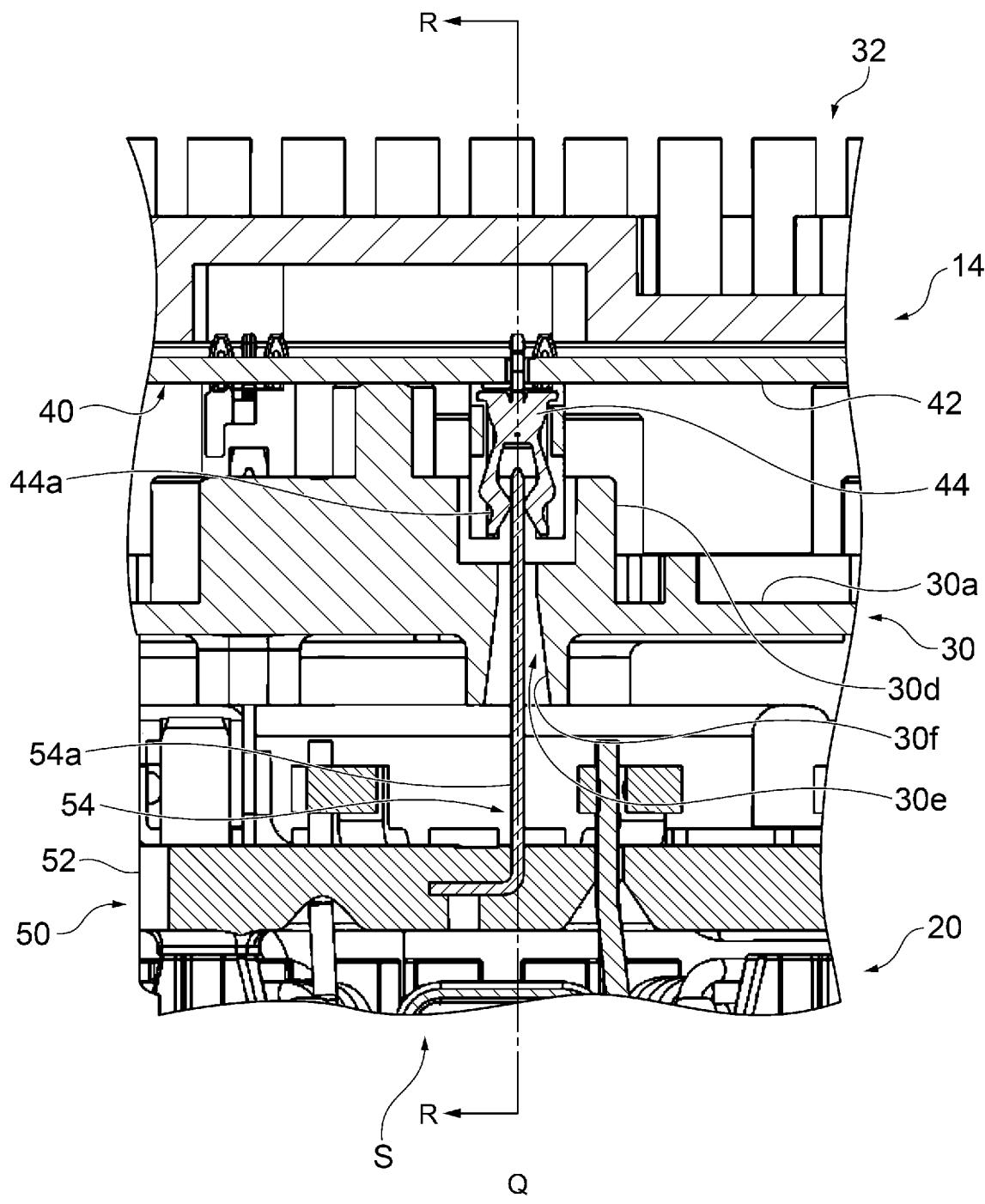
FIG. 5 is an enlarged view showing an area Q in FIG. 4.
Figure 6:
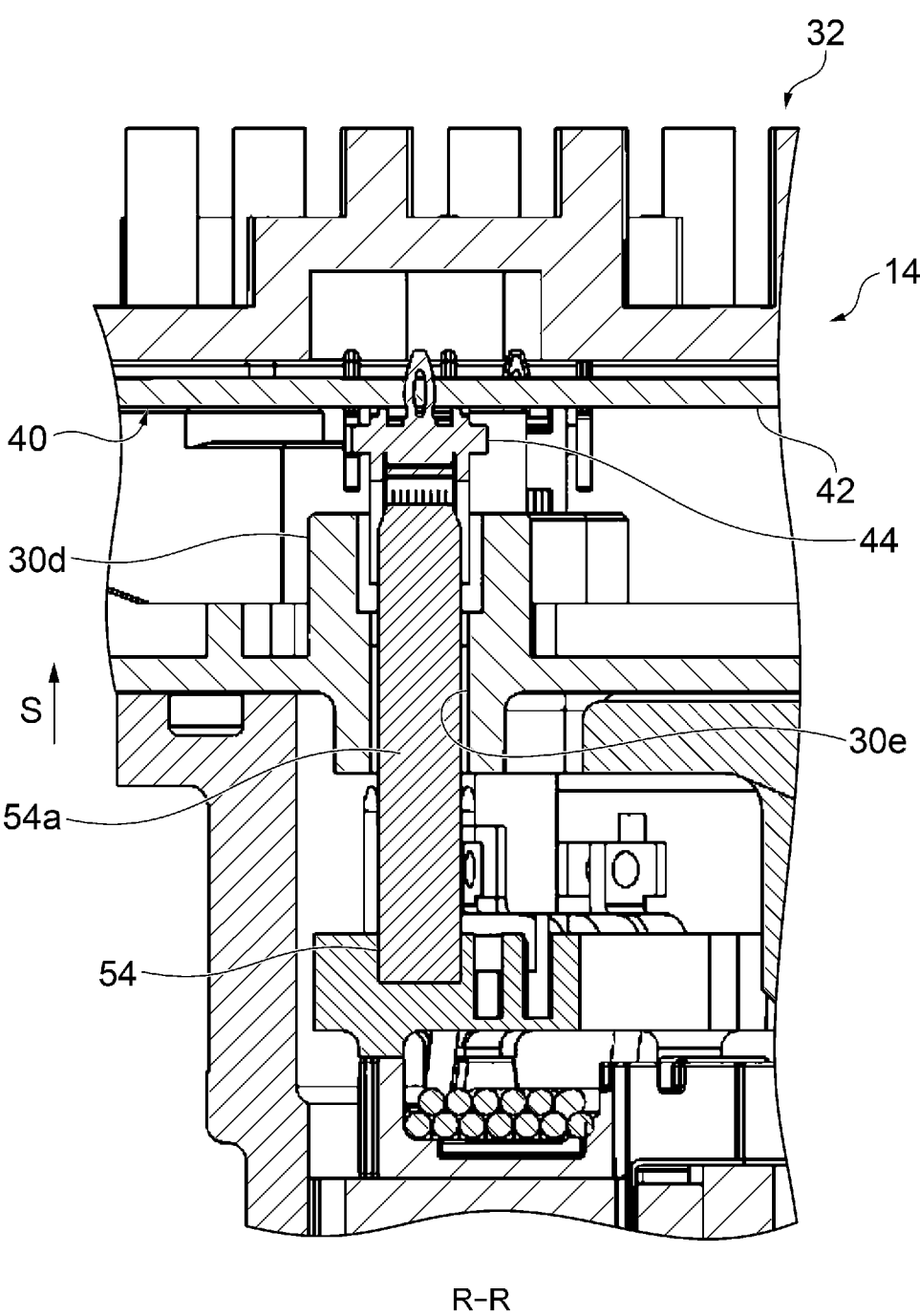
FIG. 6 is a sectional view taken along the R-R line in FIG. 5.

FIG. 4 is the sectional view taken along the P-P line in FIG. 2. FIG. 5 is the enlarged view showing the area Q in FIG. 4. FIG. 6 is the sectional view taken along the R-R line in FIG. 5. The motor 12 further includes a bus bar unit 50. The bus bar unit 50 has a resin plate 52 and a bus bar 54. The resin plate 52 extends on a plane perpendicular to the motor shaft 22. The resin plate 52 is arranged to block the one side of the cylindrical part 20a of the motor housing 20 in which the stator and the rotor are housed. In the present embodiment, the bus bar 54 is insert-molded in the resin plate 52. The bus bar 54 may be fixed in the resin plate 52 by another fixing method such as press fitting. The bus bar 54 is formed to assume a shape obtained by bending a long and narrow rectangular sheet metal into an L-shape. The bus bar 54 is fixed on the resin plate 52 in such a manner that the long part is parallel to the motor shaft 22. The long part of the bus bar 54 is a bus bar terminal 54a. The bus bar 54 is electrically connected to the coil of the stator. The motor 12 according to the present embodiment is a 3-phase motor and therefore three bus bars 54 are provided. However, needless to say, the number of the bus bars 54 is not limited to three.

The electronic control unit 14 further includes a control substrate 40. The control substrate 40 controls operation of the motor 12. The cover member 30 is interposed between the control substrate 40 and the motor 12. The control substrate 40 has a base substrate 42 and a connection terminal 44. In the base substrate 42, various (non-illustrated) electric elements to be used for controlling the motor 12 are mounted. The connection terminal 44 is fitted to the bus bar terminal 54a and is made to electrically connect the control substrate 40 to the stator. Due to this, the connection terminal 44 is attached to the side, which is opposite to the bus bar unit 50, of the base substrate 42. The connection terminal 44 is formed to assume a C-shape whose one end opens. The connection terminal 44 is attached to the base substrate 42, so that the opening is directed towards the side of the bus bar unit 50.

A method for assembling the motor unit 10 will be explained. First, the bus bar unit 50 is fixed to the stator and the bus bar 54 is connected to the coil of the stator. The stator, to which the bus bar unit 50 is fixed, is inserted into the motor housing 20. Then, the rotor fixed to the motor shaft 22 is housed in the center of the stator. The motor 12 is assembled in this manner. At this time, the bus bar terminal 54a protrudes from the resin plate 52 parallel to the motor shaft 22.

Meanwhile, the control substrate 40 is fixed to the cover member 30. The heat sink 32 is attached to the flange 30c of the cover member 30. The electronic control unit 14 is assembled in this manner.

Next, the electronic control unit 14 is assembled to the motor 12. Concretely, the electronic control unit 14 is mounted on the motor 12, so that the bottom plate 30a of the cover member 30 faces the resin plate 52, and the cover member 30 is fixed to the flange 20b of the motor housing 20.

The cover member 30 has a through hole 30e. When the electronic control unit 14 is mounted on the motor 12, the bus bar terminal 54a pieces through the through hole 30e. Then, the bus bar terminal 54a is inserted into the opening of the connection terminal 44. In this manner, the connection terminal 44 is fitted to the bus bar terminal 54a and is made to electrically connect the control substrate 40 to the stator. When dirt and foreign substances enter a fitting location 44a for the bus bar terminal 54a and the connection terminal 44, short-circuiting may occur with respect to the adjacent conductor.

Therefore, the cover member 30 according to the present embodiment has the enclosing part 30d. The enclosing part 30d encloses the fitting location 44a for the bus bar terminal 54a and the connection terminal 44, as seen in a piercing direction of the bus bar terminal 54a, in a state in which the bus bar terminal 54a is inserted into the connection terminal 44. The enclosing part 30d contains the fitting location 44a in an axial direction. This can thereby suppress entry of dirt and foreign substances into the fitting location 44a. Therefore, the short-circuiting with respect to the adjacent conductor can be avoided. As described above, the motor 12 according to the present embodiment is a 3-phase motor and therefore three bus bars 54 are provided. Therefore, three enclosing parts 30d are similarly provided in the cover member 30 according to the present embodiment.

Further, the length of the bus bar terminal 54a is comparatively long as described above. Therefore, a positional precision of a tip part of the bus bar terminal 54a becomes worse in a certain case due to a tilt or deformation of the bus bar terminal 54a. Thus, when the tip part of the bus bar terminal 54a is inserted as it is into the connection terminal 44, entanglement may occur between the bus bar terminal 54a and the connection terminal 44.

Therefore, the inner surface of the through hole 30e has a pair of inclined surfaces 30f. An inclined surface 30f is tilted in such a manner that, the farther the bus bar terminal 54a proceeds in a direction of insertion S, the smaller the width becomes. Due to this, the bus bar terminal 54a can be correctly guided and entanglement at the fitting location 44a for the bus bar terminal 54a and the connection terminal 44 can be suppressed. Due to this, increase of electrical resistance and thermal resistance possibly caused by the entanglement can be avoided, so that reliability can be enhanced.

The cover member 30 is composed of resin. This can reduce the thermal influence between the motor 12 and the control substrate 40 in comparison with the case in which the cover member 30 is composed of metal. Therefore, for example, an expensive electric element with high thermal resistance does not need to be mounted on the control substrate 40, so that the costs can be reduced. The cover member 30 may be composed of metal such as aluminum.

While the present invention has been explained by referring to the embodiment, the present invention is not limited to the above embodiment and appropriately combined or replaced configurations in the embodiment are also included in the present invention. Further, it is also possible to appropriately rearrange the combination and the order of processing in the embodiment as well as to apply modifications such as various design variations based on the skilled person's knowledge. The embodiment, to which the above modifications are applied, can also be included in the scope of the present invention.

Reference signs list: 10 Motor unit, 12 Motor, 14 Electronic control unit, 20 Motor housing, 20a Cylindrical part, 20b Flange, 22 Motor shaft, 30 Cover member, 30a Bottom plate, 30b Side wall, 30c Flange, 30d Enclosing part, 30e Through hole, 30f Inclined surface, 32 Heat sink, 32a Fin, 40 Control substrate, 42 Base substrate, 44 Connection terminal, 44a Fitting location, 50 Bus bar unit, 52 Resin plate, 54 Bus bar, 54a Bus bar terminal

The invention claimed is:
1. A cover member for a motor unit interposed between a motor and a control substrate for controlling operation of the motor, comprising:
    the motor has a bus bar terminal electrically connected to a stator coil;

the control substrate has a connection terminal that is fitted to the bus bar terminal and is structured and arranged to electrically connect the control substrate to a stator;

the cover member has a through hole, through which the bus bar terminal pierces, and an enclosing part for enclosing a fitting location for the bus bar terminal and the connection terminal, as seen in a piercing direction of the bus bar terminal; and wherein the enclosing part has an inner radial extent greater than that of the through hole relative to the piercing direction.

2. The cover member according to claim 1, wherein an inner surface of the through hole has an inclined surface, which is tilted such that, the farther the bus bar terminal proceeds in a direction of insertion, the smaller the width becomes.

3. The cover member according to claim 1, wherein the cover member is composed of resin.

4. The cover member according to claim 1, wherein the cover member includes a bottom plate, and the enclosing part has a cylindrical shape that projects axially from the bottom plate towards the base substrate.

5. The cover member according to claim 4, wherein the through hole has a part projecting perpendicularly from the bottom plate axially away from the base substrate.

6. The cover member according to claim 5, wherein the through hole opens into the enclosing part.

7. A motor unit, comprising:

a control substrate, a motor, and a cover member interposed between the control substrate and the motor, the motor having a bus bar terminal electrically connected to a stator coil of the motor, the control substrate having a connection terminal that is fitted to the bus bar terminal and is structured and arranged to electrically connect the control substrate to the stator, the cover member having a through hole, through which the bus bar terminal pierces in a piercing direction, and an enclosing part for enclosing a fitting location for the bus bar terminal and the connection terminal, as seen in the piercing direction of the bus bar terminal; and wherein the enclosing part has an inner radial extent greater than that of the through hole relative to the piercing direction.

8. The motor unit according to claim 7, wherein an inner surface of the through hole has an inclined surface.

9. The motor unit according to claim 8, wherein the inclined surface is tilted such that, the farther the bus bar terminal proceeds in a direction of insertion, the smaller the width becomes.

10. The motor unit according to claim 8, wherein the cover member is composed of resin.

11. The motor unit according to claim 7, wherein the cover member is composed of resin.

12. The motor unit according to claim 7, wherein the motor is a 3-phase motor.

13. The motor unit according to claim 7, wherein the cover member includes a bottom plate, and wherein the enclosing part has a cylindrical shape that projects axially from the bottom plate towards the base substrate.

14. The motor unit according to claim 13, wherein the through hole has a part projecting perpendicularly from the bottom plate axially away from the base substrate.

15. The motor unit according to claim 14, wherein the through hole opens into the enclosing part.

* * * * *